US012586996B2

(12) United States Patent     (10) Patent No.: US 12,586,996 B2
Collins     (45) Date of Patent: Mar. 24, 2026

(54) JUNCTION BOX CONNECTOR WITH WATERTIGHT GLAND

(71) Applicant: Nicholas Ryan Collins, Severn, MD (US)

(72) Inventor: Nicholas Ryan Collins, Severn, MD (US)

( * ) Notice: Subject to any disclaimer, the term of this patent is extended or adjusted under 35 U.S.C. 154(b) by 123 days.

(21) Appl. No.: 18/348,445

(22) Filed: Jul. 7, 2023

(65) Prior Publication Data

US 2025/0015576 A1     Jan. 9, 2025

(51) Int. Cl.
*H02G 3/08* (2006.01)

(52) U.S. Cl.
CPC .................................... *H02G 3/088* (2013.01)

(58) Field of Classification Search
CPC ............ H02G 3/08; H02G 3/081; H02G 3/22; H02G 3/18; H02G 3/00; H02G 3/24; H02G 3/26; H02G 3/36; H02G 15/00; H02G 15/003; H02G 15/007; H02G 15/013; H02G 15/04; H02G 15/043; H02G 15/08; H02G 15/20; H02G 15/23
USPC ......... 174/50, 650, 151, 656, 480, 481, 659, 174/660, 665, 668, 669, 68.1, 135, 72 A, 174/152 G, 153 G, 152 R; 285/222.1, 285/222.2, 213, 149.1; 248/68.1, 49
See application file for complete search history.

(56) References Cited

U.S. PATENT DOCUMENTS

| | | | | | |
|---|---|---|---|---|---|
| 3,580,988 | A | * | 5/1971 | Orlowski ............... | H02G 3/083 |
| | | | | | 277/606 |
| 4,030,741 | A | * | 6/1977 | Fidrych .................... | F16L 5/00 |
| | | | | | 174/653 |
| 4,525,000 | A | * | 6/1985 | Bachle ................. | H02G 3/0675 |
| | | | | | 174/653 |
| 4,692,561 | A | * | 9/1987 | Nattel .................. | H02G 15/013 |
| | | | | | 174/653 |
| 6,034,325 | A | * | 3/2000 | Nattel ................ | H01R 13/5205 |
| | | | | | 174/59 |
| 7,049,515 | B1 | * | 5/2006 | Collins .................. | H02G 3/083 |
| | | | | | 174/58 |
| 7,431,343 | B2 | * | 10/2008 | Chiu .................... | F16L 25/0036 |
| | | | | | 285/154.3 |
| 8,106,313 | B2 | * | 1/2012 | Tremaine ................. | H02G 3/22 |
| | | | | | 174/653 |
| 8,367,944 | B2 | * | 2/2013 | Chiou .................. | H02G 3/0691 |
| | | | | | 174/653 |
| 8,657,626 | B2 | * | 2/2014 | Duval .................. | H02G 15/068 |
| | | | | | 439/583 |
| 12,215,560 | B2 | * | 2/2025 | Tovar Cardona ... | E21B 33/0407 |

\* cited by examiner

*Primary Examiner* — Angel R Estrada

(74) *Attorney, Agent, or Firm* — Dunlap Bennett & Ludwig PLLC

(57)     ABSTRACT

A junction box connector is disclosed with a gland specially formed to provide a watertight seal for service entrance cables being passed through electrical junction box walls. The junction box connector includes a central connector and a hexagonal connector housing, with the central connector receiving and holding the gland when the hexagonal connector housing is threaded onto the central connector. The gland has an irregularly shaped passage formed to match the irregular cross-sectional shape of a service entrance cable. The matching of passage shape and cable shape allows the gland to provide a watertight seal around the service entrance cable and prevent water leakage into a junction box.

8 Claims, 4 Drawing Sheets

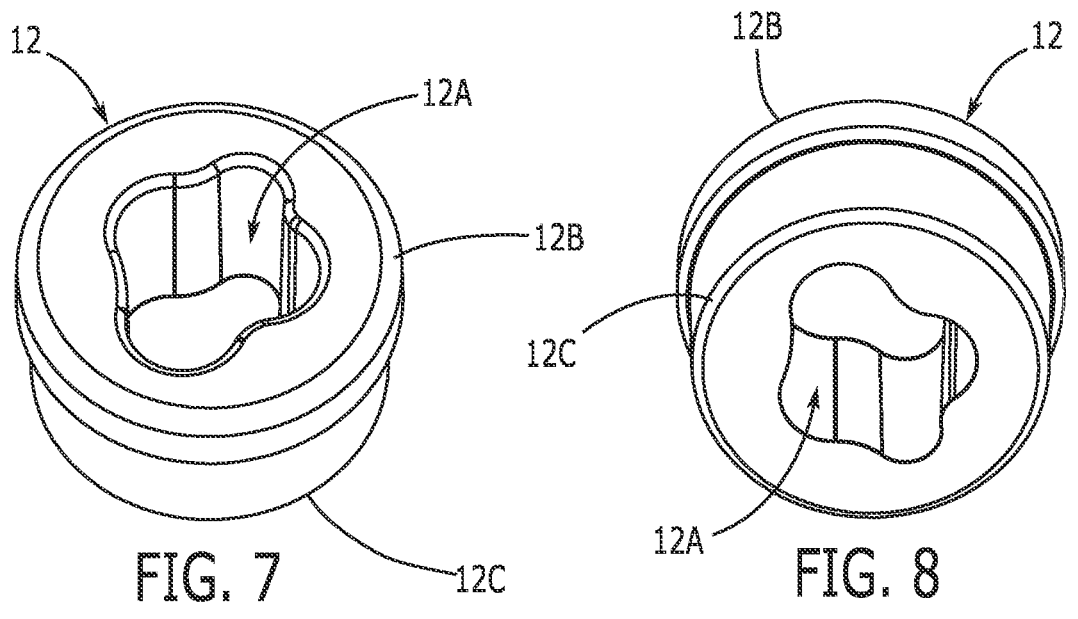
FIG. 7          FIG. 8
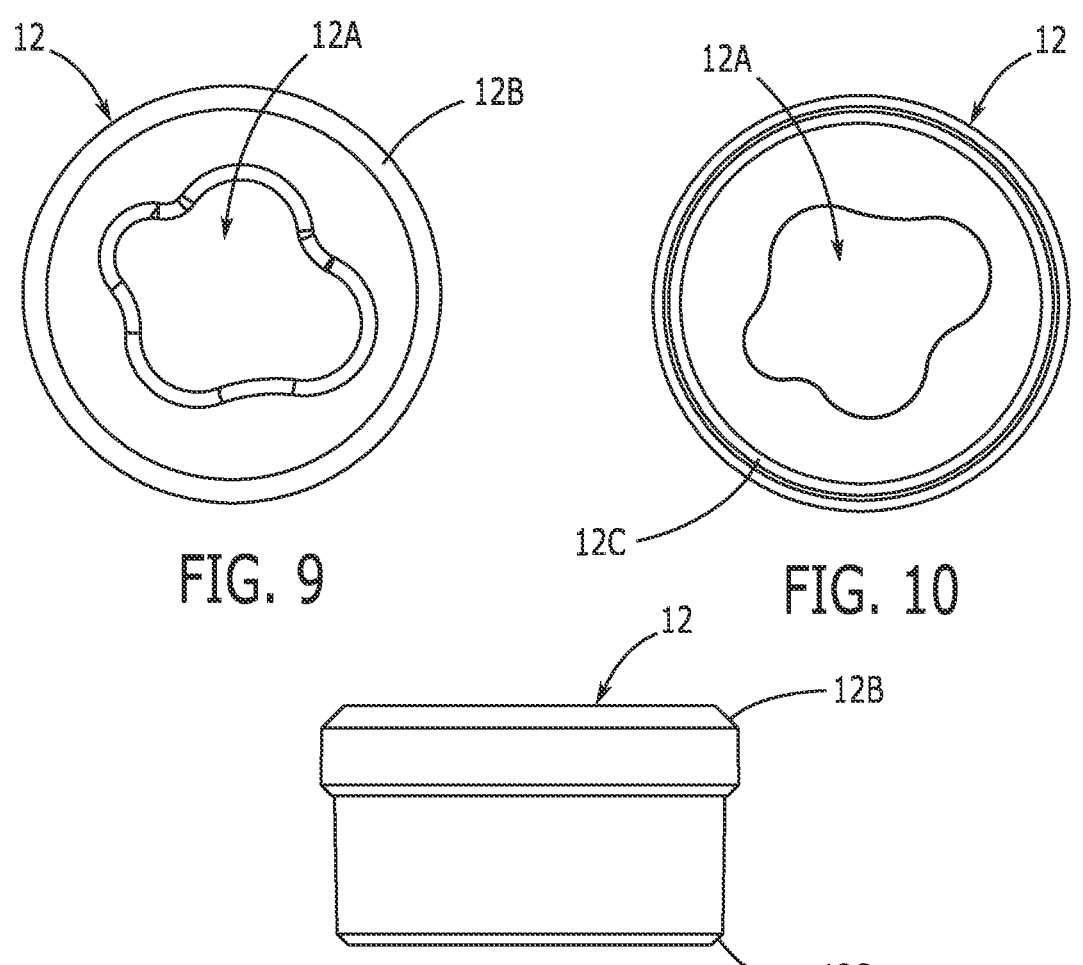
FIG. 9          FIG. 10
FIG. 11

JUNCTION BOX CONNECTOR WITH WATERTIGHT GLAND

BACKGROUND OF THE INVENTION

The present invention relates to seals and glands and, more particularly, to a junction box connector with a watertight gland that prevents passage of fluids through the connector when used in conjunction with cables having non-standard cable shapes.

Electrical power is a necessary and crucial part of modern life. As such, providing people with access to safe and easy to use electrical power is paramount when updating or installing electrical power systems in buildings. Junction boxes placed on easy to access exterior portions of buildings are typically used to connect those buildings to electrical power grids of utility companies. To provide a proper connection, specialized service entrance cables, such as service entrance reinforcement tape (SER) cables, must be used to connect the building to the power grid and pass through a connector placed in the wall of the junction box.

However, these service entrance cables often have unique shapes that do not match well with conventional glands in conventional junction box connectors. Given that the junction boxes typically need to be outdoors, the mismatch between service entrance cables and conventional glands causes issues with the ingress of water into the junction boxes that may potentially cause damage to the electrical system or instigate fires. When installing service entrance cables into junction boxes, electricians are often forced to modify conventional glands using tools like drills or knives to allow the service entrance cables to pass through the conventional glands. These modified glands are often haphazard and do not create a watertight seal. This further increases the potential for damage to electrical systems and the possibility of fires. As such, junction boxes often need to be placed in the driest locations possible, though such locations may not be easy to access and sometimes may not exist due to the location of the building or prevailing weather and climate.

As can be seen, there is a need for a junction box connector with a gland that matches the unique shapes required for service entrance cables and that prevents the passage of water through the gland. The present invention provides a junction box connector with a gland that matches the shape of service entrance cables, such as spiraled cables and SER cables, to create a watertight seal around the service entrance cable as it passes through a wall of a junction box. The present invention thus prevents damage to a building's electrical system and prevents the ability of a water leak into the junction box to instigate a fire. Further, the present invention allows for junction boxes to be placed in easy to access locations no matter how wet or damp the location is.

SUMMARY OF THE INVENTION

In one aspect of the present invention, a gland is provided. The gland comprises a top gland surface and a bottom gland surface with a cylindrical body extending therebetween, and a passage that extends through the cylindrical body between the top and bottom gland surfaces. The passage has an irregular shape that comprises a plurality of lobes extending the full length of the passage. The irregular shape of the passage may further correspond to a cross-sectional shape of a service entrance reinforcement tape cable. Additionally, the cylindrical body may comprise a top portion proximal to the top gland surface and a bottom portion proximal to the bottom gland surface, with the top portion having a larger circumference than the bottom portion.

In another aspect of the present invention, a junction box connector is provided. The junction box connector comprises a central connector having a cylindrical connector body. The cylindrical connector body includes a threaded top portion, a threaded bottom portion, and a hexagonal middle portion, with a central connector hole extending through the cylindrical connector body. The junction box connector further comprises a hexagonal connector housing having a threaded central housing hole configured to couple to the threaded top portion of the central connector. The junction box connector also includes a lock ring configured to couple to the threaded bottom portion of the central connector, and a washer that fits around the threaded bottom portion of the central connector between the hexagonal middle portion and the lock ring. Additionally, the junction box connector has a gland with a cylindrical gland body configured to be received within the central connector hole and to be held in place by the top portion of the central connector and the hexagonal connector housing, wherein the gland includes a passage having an irregular cross-sectional shape. A seal ring is securely held between the hexagonal housing and the gland to provide a more complete seal in the junction housing.

In another aspect of the present invention, the gland further comprises a top gland surface and a bottom gland surface with the cylindrical gland body extending therebetween, a top gland portion proximal to the top gland surface and a bottom gland portion proximal to the bottom gland surface, and the top gland portion having a larger circumference than the bottom portion.

In another aspect of the present invention, the irregular cross-sectional shape of the passage comprises a plurality of lobes extending the full length of the passage.

In another aspect of the present invention, the irregular cross-sectional shape of the passage corresponds to a cross-sectional shape of a service entrance reinforcement tape cable.

In another aspect of the present invention, the cylindrical gland body comprises a sloped shelf extending between the top gland portion and the bottom gland portion, and the sloped shelf bears against the threaded top portion of the central connector.

These and other features, aspects and advantages of the present invention will become better understood with reference to the following drawings, description, and claims.

BRIEF DESCRIPTION OF THE DRAWINGS

FIG. 7 is a top perspective view of the gland in accordance with an embodiment of the present invention;

FIG. 8 is a bottom perspective view thereof;

FIG. 9 is a top view thereof;

FIG. 10 is a bottom view thereof; and

FIG. 11 is a side view thereof.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a junction box connector comprising a gland having an irregularly shaped passage that is sized and shaped to match the cross-sectional shape of a service entrance cable, such as a spiraled cable or SER cable. The irregularly shaped passage includes a plurality of lobes that extend for the length of the irregularly shaped passage. Each of the plurality of lobes is sized to correspond to a particular wire within the service entrance cable.

The junction box connector includes a central connector that receives and holds the gland in conjunction with a hexagonal connector housing threaded onto a top portion of the central connector. The junction box connector further includes a lock ring threaded onto a bottom portion of the central connector. A seal ring may be located between the hexagonal connector housing and the gland. A washer may be located between a hexagonal middle portion of the central connector and the lock ring.

Thus, the present invention is able to provide a junction box connector with a gland that creates a watertight seal around service entrance cables as the cables pass through a wall of a junction box. This prevents damage to a building's electrical system and prevents the ability of a water leak into the junction box to instigate a fire. Further, the present invention allows for junction boxes to be placed in easy to access locations no matter how wet or damp the location is.

It should be noted that the materials of manufacture for the present invention are not particularly limited. For example, the connector housing may be formed of a metal, a plastic, or other durable and strong Underwriter's Laboratory (UL) listed materials suitable for use with electrical systems. Further, the gland may be formed of rubbers, elastomers, or other durable high-flame resistant elastic materials that are UL listed and suitable for use in electrical systems.

Additionally, it should be noted that the method of manufacture for the present invention is not particularly limited. For example, the central connector may be die-cast, machined, or formed through additive manufacturing, among other known methods.

Referring to FIGS. 1-11, an embodiment of a junction box connector in accordance with the present invention is shown. The present invention comprises a junction box connector 10 that allows a service entrance cable 11B, such as an SER cable, to be passed through a junction box wall 11A. The junction box connector includes a central connector 11C, a washer 11D, a lock ring 11E, a gland 12, a conical seal 14, and a hexagonal connector housing 16.

Figures 1, 2:
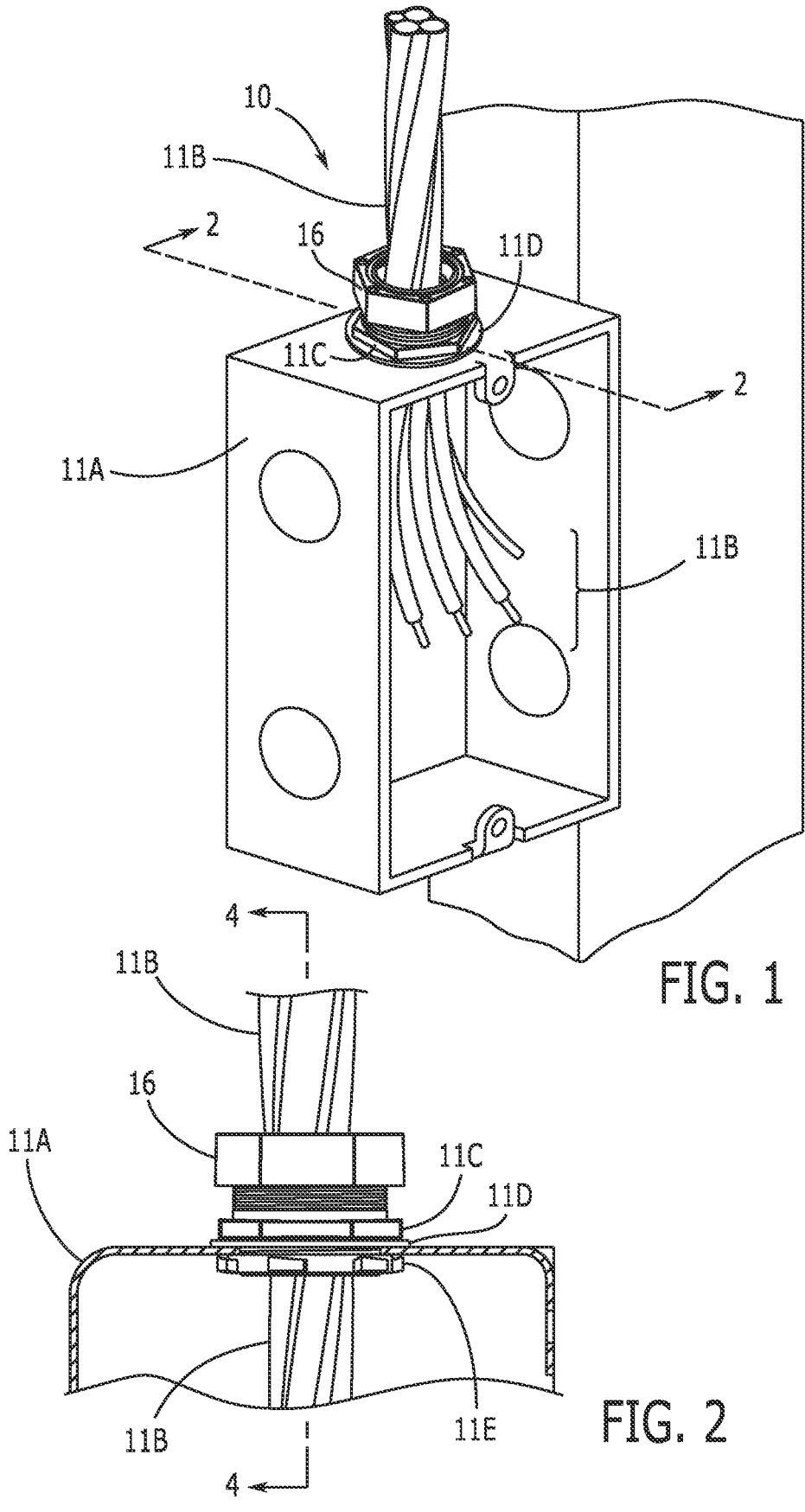
FIG. 1 is a front perspective view of a gland attached to a junction box in accordance with an embodiment of the present invention.
FIG. 2 is a cross-sectional view thereof taken along line 2-2 of FIG. 1.
Figure 3:
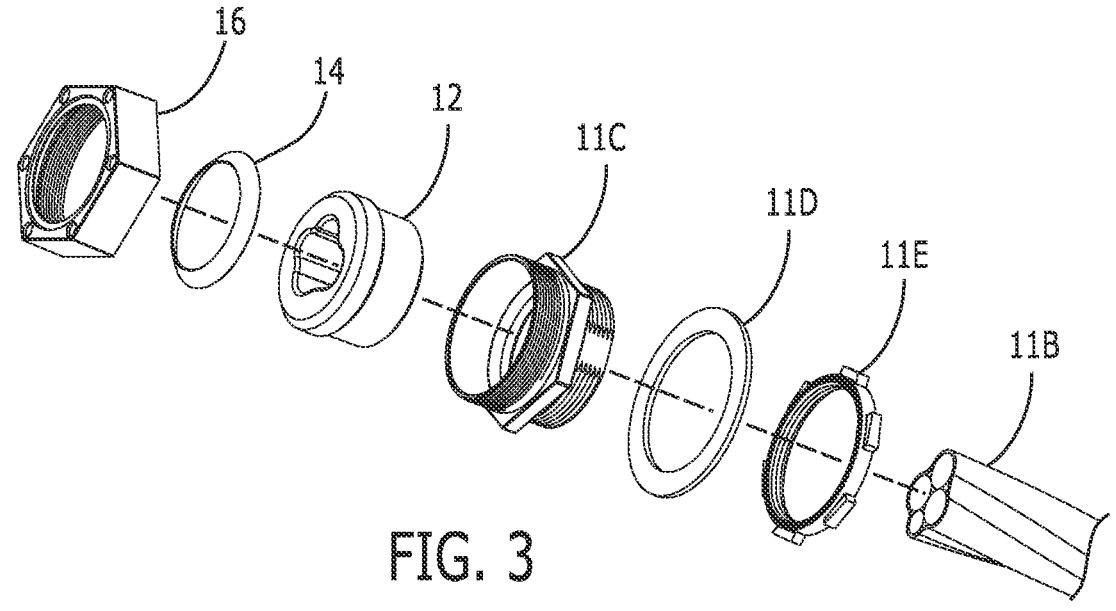
FIG. 3 is an exploded perspective view of the gland in accordance with an embodiment of the present invention.
Figures 5, 6:
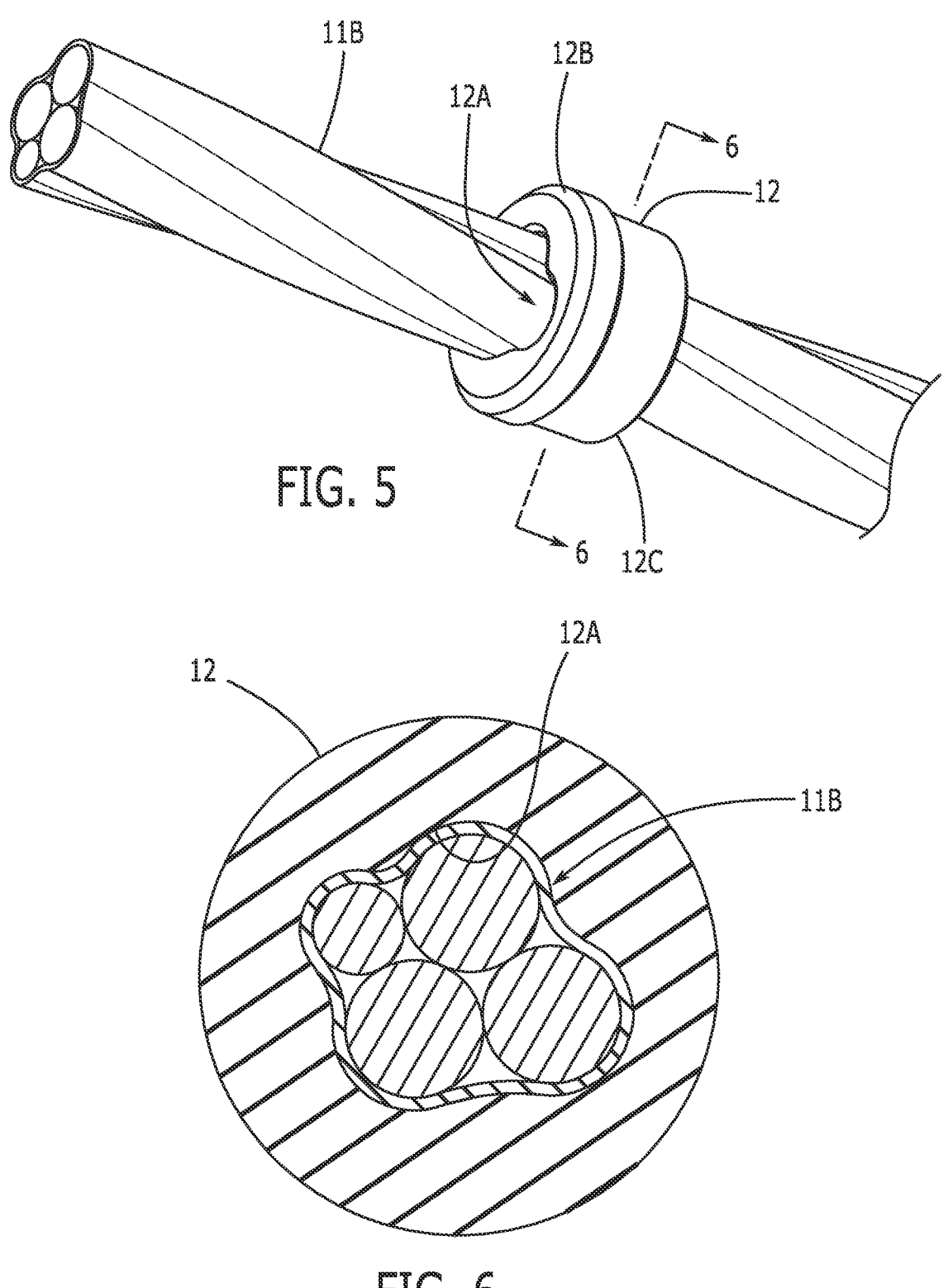
FIG. 5 is a perspective view of the gland with an SER cable inserted through the gland in accordance with an embodiment of the present invention.
FIG. 6 is a cross-sectional view thereof taken along line 6-6 of FIG. 5.

The service entrance cable 11B typically includes four separate wires spiraled together and wrapped in a protective sleeve, as best seen in FIGS. 3, 5, and 6. Each separate wire forms a respective lobe in the protective sleeve, producing an irregular cross-sectional shape for the service entrance cable 11B. Further, the arrangement of the separate wires typically requires two equally sized opposing lobes, a large lobe, and a small lobe, with the large and small lobes being formed on opposing sides of the two equally sized lobes relative to one another.

The gland 12 includes a top gland surface 12B, a bottom gland surface 12C, a cylindrical body extending between the top gland surface 12B and the bottom gland surface 12C. The gland 12 includes a top gland portion proximal to the top gland surface 12B and a bottom gland portion proximal to the bottom gland surface 12C. The top gland portion has a larger circumference than the bottom gland portion, with a sloped shelf extending between the top gland portion and bottom gland portion. An angled top gland edge extends between the top gland surface 12B and the top gland portion. An angled bottom gland edge extends between the bottom gland surface 12C and the bottom gland portion.

Further, a passage 12A extends through the cylindrical body from the top gland surface 12B to the bottom gland surface 12C. The passage 12A is irregularly shaped such that it substantially matches the irregular cross-sectional shape of the service entrance cable 11B. The passage 12A is formed from a plurality of lobes that extend the full length of the passage 12A. Each of the plurality of lobes in the passage 12A is formed to correspond to one of the equally sized lobes, large lobe, or small lobe of the service entrance cable 11B. Thus, the gland 12 is able to be twisted onto the service entrance cable 11B and form a watertight seal against the service entrance cable 11B when the service entrance cable 11B extends through the passage 12A.

The central connector 11C includes cylindrical connector body having a threaded top portion, a threaded bottom portion, and a hexagonal middle portion. Further, a central connector hole passes through the cylindrical connector body and is configured to receive and hold the gland 12 within the junction box connector 10. The central connector hole includes a middle ridge with a top slope and a bottom slope. The top slope is formed to substantially match the orientation of the angled bottom gland edge of the gland 12, such that, when the top slope bears against the angled bottom gland edge, a seal is formed. Additionally, the sloped shelf of the gland 12 is configured to bear and seal against a top edge of the top threaded portion of the central connector 11C.

The lock ring 11E includes a threaded lock ring hole configured to cooperate with and couple to the threaded bottom portion of the central connector 11C. A plurality of teeth may be located around the circumference of the lock ring 11E to allow the lock ring to be more easily tightened onto the threaded bottom portion of the central connector 11C. A washer 11D may be placed between the lock ring 11E and hexagonal middle portion of the central connector 11C, and more preferably between the central connector 11C and the junction box wall 11A, with the lock ring 11E on the other side of the junction box wall 11A. Such a configuration allows a seal to be made between the central connector 11C, washer 11D, junction box wall 11A, and lock ring 11E as the lock ring 11E is tightened onto the threaded bottom portion of the central connector 11C during installation of the junction box connector 10.

Figure 4:
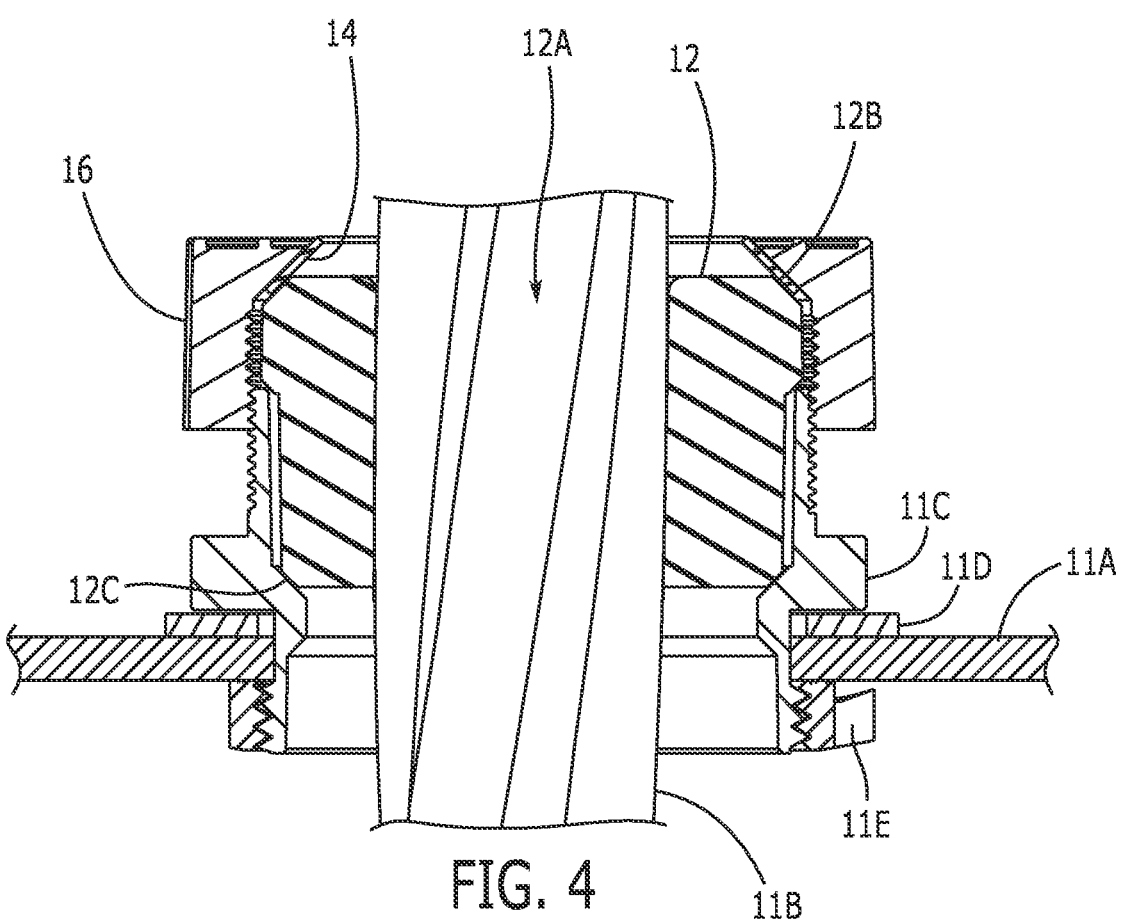
FIG. 4 is a cross-sectional view of the gland attached to the junction box take along line 4-4 of FIG. 2.

The hexagonal connector housing 16 comprises an outer housing surface with a hexagonal cross-section, and a central housing hole with a cylindrical cross-section. The central housing hole is formed of a threaded portion and an angled portion, as best seen in FIG. 4. The threaded portion of the central housing hole is formed to cooperate with and couple to the threaded top portion of the central connector 11C. The angled portion of the central housing hole is formed to correspond to the angle of the angled top gland edge of the gland 12.

A conical seal 14 is shaped to correspond to the angle of the angled top gland edge of the gland 12 so that the interior portion of the conical seal 14 may bear against the angled top gland edge. The conical seal 14 is thus also configured to bear against the angled portion of the central housing hole. During installation, the conical seal 14 is then able to form a watertight seal between the angled top gland edge and the angled portion of the central housing hole when the hexagonal connector housing 16 is tightened onto the threaded top portion of the central connector 11C.

In using this configuration and shape of components, the present invention is able to provide a junction box connector with a gland that creates a watertight seal around service entrance cables as the cables pass through a wall of a junction box. This prevents damage to a building's electrical system and prevents the ability of a water leak into the junction box to instigate a fire. Further, the present invention allows for junction boxes to be placed in easy to access locations no matter how wet or damp the location is.

It should be understood, of course, that the foregoing relates to exemplary embodiments of the invention and that modifications may be made without departing from the spirit and scope of the invention as set forth in the following claims.

What is claimed is:

1. A gland comprising:
   a top gland surface and a bottom gland surface with a cylindrical body extending therebetween; and
   a passage that extends through the cylindrical body between the top and bottom gland surfaces, wherein the passage comprises an irregular shape, the irregular shape comprising a plurality of lobes extending the full length of the passage, at least two of the plurality of lobes being equally sized, at least one of the plurality of lobes being larger than the at least two equally sized lobes, and at least another one of the plurality of lobes being smaller than the at least two equally sized lobes.

2. The gland of claim 1, wherein the irregular shape of the passage corresponds to a cross-sectional shape of a service entrance reinforcement tape cable.

3. The gland of claim 1, wherein the cylindrical body comprises a top portion proximal to the top gland surface and a bottom portion proximal to the bottom gland surface, with the top portion having a larger circumference than the bottom portion.

4. A junction box connector comprising:
   a central connector having a cylindrical connector body with a threaded top portion, a threaded bottom portion, and a hexagonal middle portion, wherein a central connector hole extends through the cylindrical connector body;
   a hexagonal connector housing having a threaded central housing hole configured to couple to the threaded top portion of the central connector;
   a lock ring configured to couple to the threaded bottom portion of the central connector;
   a washer that fits around the threaded bottom portion of the central connector between the hexagonal middle portion and the lock ring;
   a gland having a cylindrical gland body configured to be received within the central connector hole and to be held in place by the top portion of the central connector and the hexagonal connector housing, wherein the gland includes a passage having an irregular cross-sectional shape, the irregular shape comprising a plurality of lobes extending the full length of the passage, at least two of the plurality of lobes being equally sized, at least one of the plurality of lobes being larger than the at least two equally sized lobes, and at least another one of the plurality of lobes being smaller than the at least two equally sized lobes; and
   a seal ring securely held between the hexagonal housing and the gland.

5. The junction box connector of claim 4, wherein the gland further comprises a top gland surface and a bottom gland surface with the cylindrical gland body extending therebetween, a top gland portion proximal to the top gland surface and a bottom gland portion proximal to the bottom gland surface, and the top gland portion having a larger circumference than the bottom portion.

6. The junction box connector of claim 4, wherein the irregular cross-sectional shape of the passage corresponds to a cross-sectional shape of a service entrance reinforcement tape cable.

7. The junction box connector of claim 4, wherein the cylindrical body comprises a sloped shelf extending between the top gland portion and the bottom gland portion, and the sloped shelf bears against the threaded top portion of the central connector.

8. The junction box connector of claim 4, wherein the lock ring comprises a plurality of teeth around an exterior surface of the lock ring.

* * * * *